(12) United States Patent
Combet et al.

(10) Patent No.: US 6,371,489 B1
(45) Date of Patent: Apr. 16, 2002

(54) CYLINDER-HEAD GASKET FOR INTERNAL COMBUSTION ENGINE

(75) Inventors: Alexis Combet, Lyons; Francis Martin, Saint-Priest, both of (FR)

(73) Assignee: Federal Mogul Sealing Systems (FR)

( * ) Notice: Subject to any disclaimer, the term of this patent is extended or adjusted under 35 U.S.C. 154(b) by 0 days.

(21) Appl. No.: 09/601,734
(22) PCT Filed: Feb. 4, 1999
(86) PCT No.: PCT/FR99/00241
§ 371 Date: Sep. 10, 2000
§ 102(e) Date: Sep. 10, 2000
(87) PCT Pub. No.: WO99/40346
PCT Pub. Date: Aug. 12, 1999

(30) Foreign Application Priority Data

Feb. 5, 1998 (FR) .............................................. 98 01573

(51) Int. Cl.⁷ ................................................. F02F 11/00
(52) U.S. Cl. ........................ 277/594; 277/596; 277/598; 277/601
(58) Field of Search ................................ 277/592, 594, 277/596, 598, 601, 600

(56) References Cited

U.S. PATENT DOCUMENTS

| 2,087,430 A | * | 7/1937 | Cummins |
| 3,170,701 A | * | 2/1965 | Hoover |
| 3,215,442 A | * | 11/1965 | Papenguth |
| 3,490,776 A | * | 1/1970 | Avery |
| 4,331,336 A | * | 5/1982 | Czernik et al. |
| 4,635,949 A | * | 1/1987 | Lucas et al. |
| 4,976,225 A | * | 12/1990 | Stang et al. ............. 123/41.74 |
| 5,033,189 A | * | 7/1991 | Desverchere et al. ...... 29/888.3 |
| 5,145,190 A | * | 9/1992 | Boardman |
| 5,267,740 A | * | 12/1993 | Stritzke |
| 5,341,779 A | * | 8/1994 | Chen et al. ............. 123/193.3 |
| 5,348,311 A | * | 9/1994 | Miyaoh et al. |
| 5,700,017 A | * | 12/1997 | Tensor |
| 5,803,465 A | * | 9/1998 | Schweiger ................. 277/593 |

* cited by examiner

Primary Examiner—Anthony Knight
Assistant Examiner—Alison K. Pickard
(74) Attorney, Agent, or Firm—Cantor Colburn LLP

(57) ABSTRACT

This gasket comprises two superimposed similar metal plates, each of which comprises a central main part and a peripheral part which are separated from one another by a slot intended to house a bead of sealing elastomer, the two parts of each plate being locally connected by bridges, the coincident slots of the two superimposed metal plates being lined with one and the same bead of sealing elastomer protruding from both sides of the gasket, and means for laterally immobilizing the two metal plates.

6 Claims, 2 Drawing Sheets

CYLINDER-HEAD GASKET FOR INTERNAL COMBUSTION ENGINE

TECHICAL FIELD

The subject of the present invention is a cylinder head gasket for an internal combustion engine.

BACKGROUND OF THE INVENTION

A cylinder head gasket is intended to be mounted between the engine block and the cylinder head of an engine, so as to provide sealing at the combustion chambers and sealing against the fluids, particularly the liquid used to cool the engine and the liquid used to lubricate the engine.

The sealing conditions differ according to whether the sealing is against the high-temperature gases around the combustion chamber or against the fluids outside the combustion chambers.

Thus, sealing against gases is achieved by metal firing rings, while sealing against the fluids is achieved using beads of elastomer.

The production of cylinder head gaskets using metal plates which constitute the core of the gasket is already known. The beads of elastomer intended to seal against the fluids are arranged on both sides of the gasket, for example using screen printing techniques or overmoulding techniques, inside grooves formed on the two sides of the plate.

While these elastomer beads provide good sealing against fluids, they have the drawback of being vulnerable when the gasket is cramped between the engine block and the cylinder head. Specifically, if the clamping force exceeds a predetermined value, the beads burst and lose their sealing function. To avoid this damage, tightening limit stops need to be provided on the gasket.

SUMMARY OF THE INVENTION

The object of the invention is to provide a cylinder head gasket obtained from a low number of elements, and which has excellent sealing properties both with respect to gases and with respect to fluids.

To this end, the cylinder head gasket to which the invention relates, of the type comprising metal plates forming the core of the gasket and elastomer beads intended to seal against fluids, such as the cooling water and the oil, is characterized in that it comprises:

two superimposed similar metal plates, each of which comprises a central main part and a peripheral part which are separated from one another by a slot intended to house a bead of sealing elastomer, the two parts of each plate being locally connected by bridges, one and the same bead of sealing elastomer protruding from both sides of the gasket, lining the coincident slots of the two superimposed metal plates, means for laterally immobilizing the two metal plates.

This gasket is of a simple structure insofar as it is made up of only three elements, two metal plates and an elastomer bead. The elastomer bead which joins the two metal plates together provides sealing against fluids by being trapped within the metal plates, allowing these plates to act as the tightening limit stop.

To ensure continuity of the sealing bead, the bridges of the two metal plates alternate from one plate to the other, so that when the two plates have been assembled these bridges occupy offset positions, and the bridges of each metal plate are offset with respect to the mid plane of this plate, so that they lie approximately mid-way through the thickness of the gasket when the two metal plates have been assembled.

According to another feature of the invention, the means for laterally immobilizing the two metal plates consist of corresponding bosses formed in these plates and intended to nest together when the two plates are superimposed. These means for laterally immobilizing the two plates come into effect before the two plates are joined together by the bead of sealing elastomer.

Advantageously, to allow the gasket to deform correctly without experiencing deterioration, each sealing bead when viewed in cross section, exhibits at least one rib protruding from each side of the gasket, and at least one rib set back from each side of the gasket.

According to another feature of the invention, the two metal plates comprise ribs which face away from each other, constituting the firing rings surrounding the openings corresponding to the combustion chambers.

BRIEF DESCRIPTION OF THE DRAWINGS

In any event, the invention will be clearly understood from the description which follows, with reference to the appended diagrammatic drawing which, by way of non-limiting example, depicts one embodiment of a cylinder head gasket.

DETAILED DESCRIPTION OF THE PREFERRED EMBODIMENT

Figure 1:
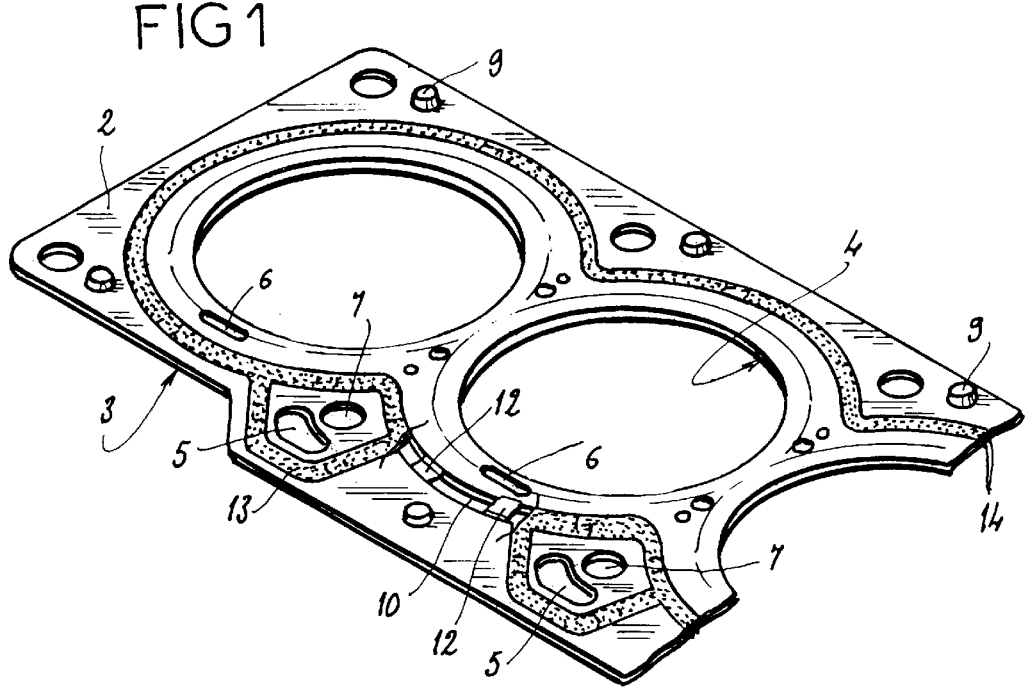
FIG. 1 is a part view in perspective of a cylinder head gasket.
Figure 2:
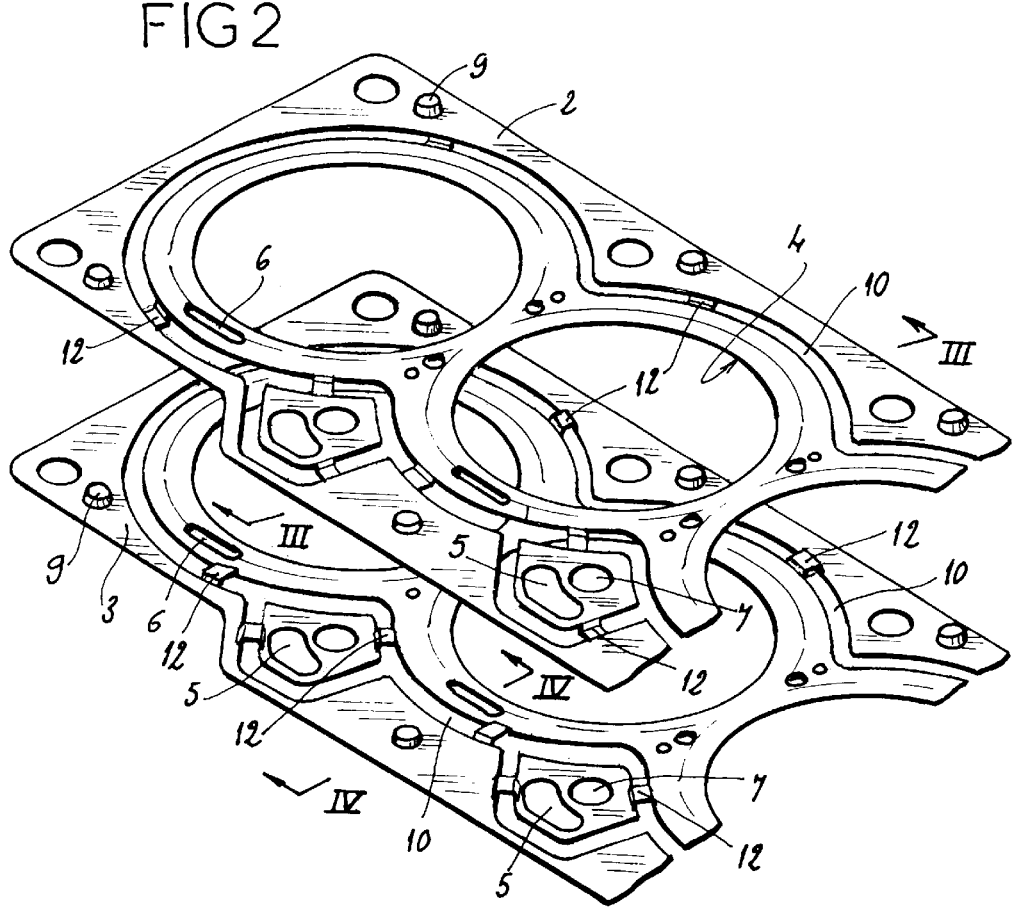
FIG. 2 is a view in exploded perspective of the two metal plates which make up this cylinder head gasket.

The cylinder head gasket according to the invention is made of three elements: two similar metal plates forming the core of the gasket, and a bead of sealing elastomer. The metal plates consist of an upper plate 2 and a lower plate 3. Each plate has openings 4 corresponding to the combustion chambers, 5 for the passage of lubricating oil, 6 for the passage of cooling water and 7 for clamping the gasket between the engine block and the cylinder head. The plates 2 and 3 have ribs 8 facing away from each other in the region of the combustion chambers, to form firing rings. The metal plates 2 and 3 also comprise a certain number of bosses 9, obtained by pressing, the bosses 9 of the plate 3 being intended to be engaged in the female part of the bosses 9 of the plate 2, as shown in particular in FIG. 4. These bosses 9 allow the two plates 2 and 3 to be immobilized laterally when these plates are superimposed. Each plate 2, 3 comprises a central main part and a peripheral part separated from one another by a slot 10. The central part and the peripheral part are connected by bridges 12.

Figure 3:
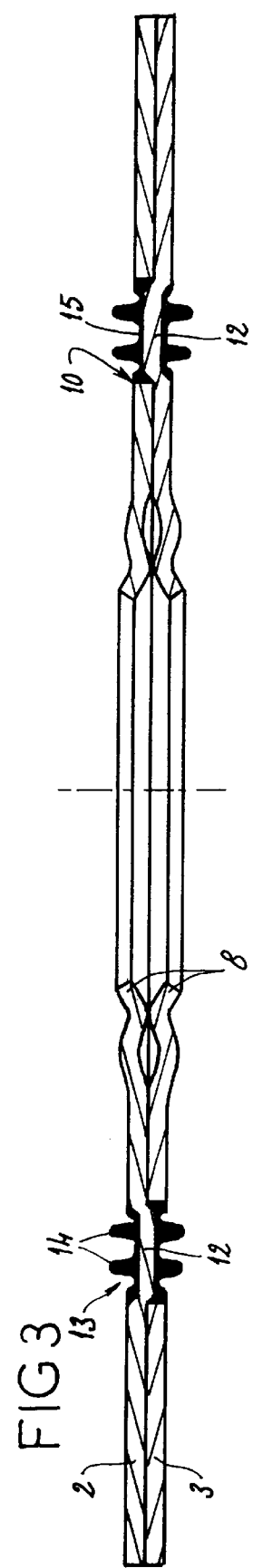
FIGS. 3 and 4 are two views in cross section on an enlarged scale of this cylinder head gasket, the sections being taken on the lines III—III and IV—IV of FIG. 1, respectively.

As shown in particular in FIG. 3, the bridges 12 of the two plates 2 and 3 alternate from one plate to the other, so that when the two plates have been assembled, these bridges occupy offset positions. Furthermore, the bridges 12 of each metal plate 2, 3 are offset from the mid plane of this plate so that they lie approximately mid-way through the thickness of the gasket when the two metal plates have been assembled.

Once the two metal plates 2, 3 have been superimposed, an elastomer bead 13 is subsequently moulded inside the slots 10.

Figure 4:
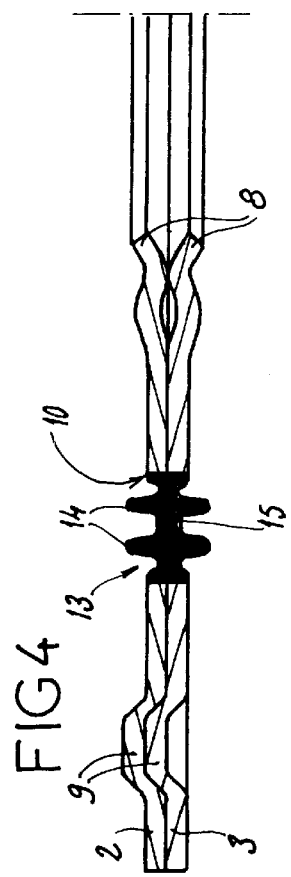

As shown in FIGS. 3 and 4, this bead connects the two plates in the regions where there are no bridges, and covers the bridges in the regions where one of the two plates has a bridge connecting the central part and the outer part.

As shown in particular in FIGS. 3 and 4, the elastomer bead comprises, when viewed in cross section, two ribs 14 projecting from each side of the two plates 2, 3 and grooves 15 set back from the two sides of the gasket.

As the gasket is clamped between the engine block and the cylinder head, the elastomer bead 13 will be compressed, without the risk of being deteriorated and of losing its sealing qualities, insofar as the bead can be compressed within the thickness of the gasket, the metal plates acting as clamping limit stops.

As is clear from the foregoing, the invention affords a great improvement to the state of the art by providing a cylinder head gasket for combustion engines which is of a simple structure and displays excellent reliability.

As goes without saying, the invention is not restricted merely to the embodiment of this gasket which has been described hereinabove by way of example; on the contrary, it encompasses all alternative forms thereof. Thus, in particular, the means of laterally immobilizing the two metal plates 2, 3 could consist not of bosses but of spot welds, without this in any way departing from the scope of the invention.

What is claimed is:

1. Cylinder head gasket for an internal combustion engine comprising:

two superimposed similar metal plates, each of which comprises a central main part and a peripheral part which are separated from one another by a slot intended to house a bead of sealing elastomer, the two parts of each plate being locally connected by bridges, a bead of sealing elastomer protruding from both sides of the gasket, lining the coincident slots of the two superimposed metal plates, means for laterally immobilizing the two metal plates.

2. Cylinder head gasket according to claim 1, wherein the bridges of the two metal plates alternate from one plate to the other, so that when the two plates have been assembled these bridges occupy offset positions.

3. Cylinder head gasket according to claim 1, wherein the bridges of each metal plate are offset with respect to the mid plane of this plate, so that they lie approximately mid-way through the thickness of the gasket when the two metal plates have been assembled.

4. Cylinder head gasket according to claim 1, wherein the means for laterally immobilizing the two metal plates consist of corresponding bosses formed in these plates and intended to nest together when the two plates are superimposed.

5. Cylinder head gasket according to claim 1, wherein each sealing bead when viewed in cross section, exhibits at least one rib protruding from each side of the gasket, and at least one rib set back from each side of the gasket.

6. Cylinder head gasket according to claim 1, wherein the two metal plates comprise ribs which face away from each other, constituting firing rings surrounding openings corresponding to the combustion chambers.

* * * * *